United States Patent
Goh

(10) Patent No.: US 8,384,795 B2
(45) Date of Patent: Feb. 26, 2013

(54) DIGITAL IMAGE SIGNAL PROCESSING METHOD AND APPARATUS, AND MEDIUM HAVING RECORDED THEREON THE METHOD

(75) Inventor: Ji-hyun Goh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 12/751,495

(22) Filed: Mar. 31, 2010

(65) Prior Publication Data

US 2010/0259634 A1    Oct. 14, 2010

(30) Foreign Application Priority Data

Apr. 14, 2009    (KR) .................. 10-2009-0032390

(51) Int. Cl.
*H04N 5/228* (2006.01)
*H04N 5/16* (2006.01)
(52) U.S. Cl. ............... 348/222.1; 348/256; 348/223.1
(58) Field of Classification Search ............ 348/222.1, 348/234, 256, 396.1, 603, 673, 687, 703, 348/E05.031
See application file for complete search history.

(56) References Cited

U.S. PATENT DOCUMENTS

| | | | |
|---|---|---|---|
| 2005/0083419 A1* | 4/2005 | Honda et al. | 348/244 |
| 2008/0137946 A1* | 6/2008 | Choe et al. | 382/167 |
| 2008/0313152 A1* | 12/2008 | Yoon et al. | 707/3 |
| 2009/0022395 A1* | 1/2009 | Cho et al. | 382/167 |
| 2009/0169194 A1* | 7/2009 | Huang et al. | 396/213 |
| 2009/0185358 A1* | 7/2009 | Liu et al. | 362/3 |
| 2009/0244107 A1* | 10/2009 | Kimura et al. | 345/690 |
| 2010/0080582 A1* | 4/2010 | Sato et al. | 399/39 |

\* cited by examiner

*Primary Examiner* — Hung Lam
(74) *Attorney, Agent, or Firm* — Drinker Biddle & Reath LLP

(57) ABSTRACT

Provided are a digital image signal processing method including determining a saturation condition by comparing a delta between a plurality of pieces of image data of an input image exhibiting different color components with a standard for white scene recognition, determining a bright condition by using a distribution of grey levels of the input image, and determining that the input image is a white scene when the input image satisfies the saturation condition and the bright condition, and a digital image signal apparatus for executing the method, and a medium having recorded thereon the method. Thus, a white scene is quickly and accurately determined. And settings of the digital image signal processing apparatus can be properly set for capturing the white scene.

19 Claims, 11 Drawing Sheets

US 8,384,795 B2

DIGITAL IMAGE SIGNAL PROCESSING METHOD AND APPARATUS, AND MEDIUM HAVING RECORDED THEREON THE METHOD

CROSS-REFERENCE TO RELATED PATENT APPLICATION

This application claims the benefit of Korean Patent Application No. 10-2009-0032390, filed on Apr. 14, 2009, in the Korean Intellectual Property Office, the entire disclosure of which is incorporated herein by reference.

BACKGROUND

1. Field of the Invention

The invention relates to a digital image signal processing method and apparatus in which a selected scene is recognized, and a medium having recorded thereon the method.

2. Description of the Related Art

Some digital image signal processing apparatuses capture an image that includes many white-based colors as a dark image. An image with many white-based colors may be referred to as a "white scene." White scenes may be captured as a dark image because the automatic exposure control of the digital image signal processing apparatus may set the shutter speed to be too quick to properly capture the white scene due to the many white-based colors. The user may be disappointed because they have not obtained a good image of the white scene.

SUMMARY OF THE INVENTION

The invention provides digital image signal method and apparatus in which a white scene is effectively recognized in order to obtain a desired photography image by determining a photography condition appropriate for a white scene, and a medium having recorded thereon the method.

According to an aspect of the invention, there is provided a digital image signal processing method including determining a saturation condition by comparing a delta between a plurality of pieces of image data of an input image exhibiting different color components with a standard for white scene recognition; determining a brightness condition by using a distribution of grey levels of the input image; and determining that the input image is a white scene when the input image satisfies the saturation condition and the brightness condition.

According to another aspect of the invention, there is provided a computer readable recording medium having recorded thereon a program for executing the digital image signal processing method.

According to another aspect of the invention, there is provided a digital image signal processing apparatus including a saturation determining unit configured to determine a saturation condition by comparing a delta between a plurality of pieces of image data exhibiting different color components with respect to an input image with a standard for white scene recognition; and a bright determining unit configured to determine a brightness condition by using a distribution of grey levels of the input image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
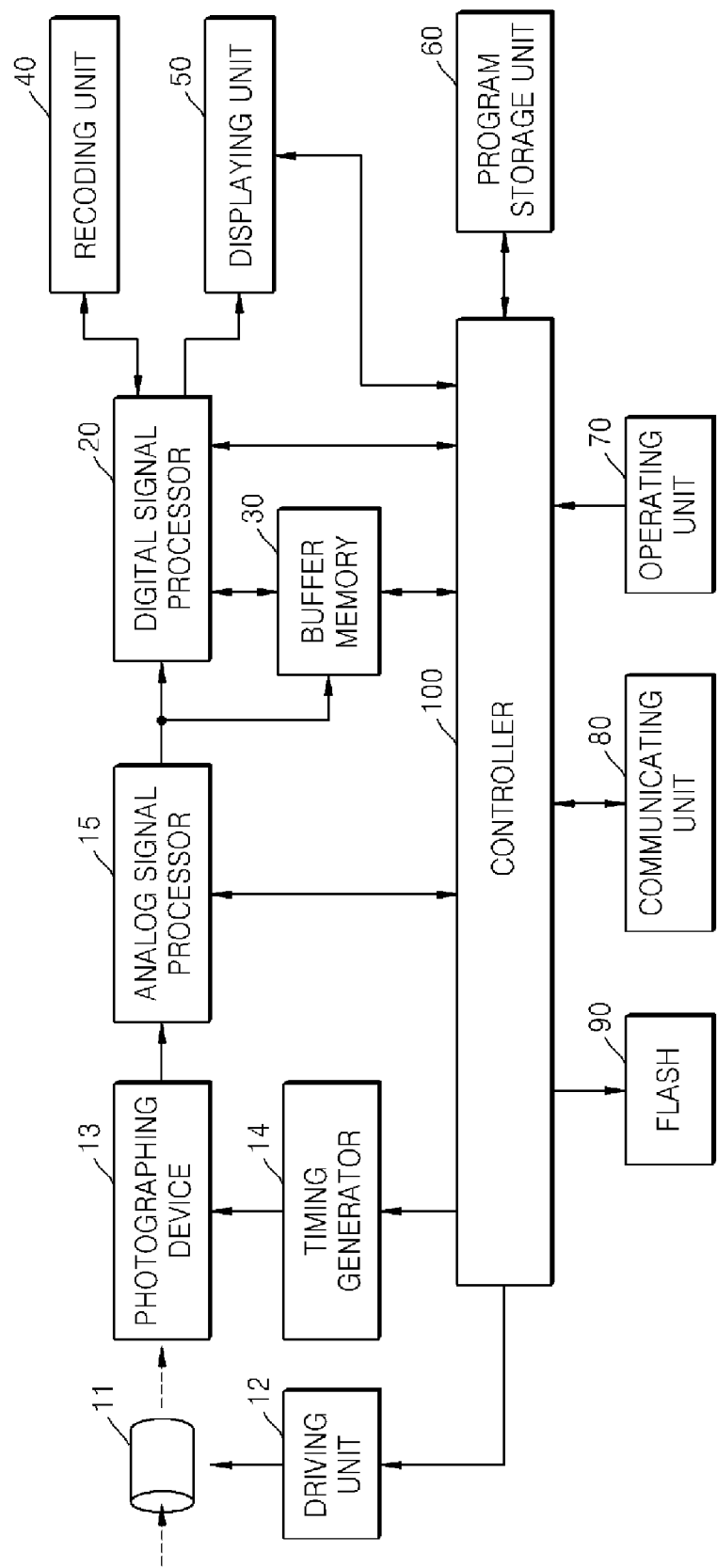
FIG. 1 is a block diagram of an example of a digital camera embodying an example of a digital image signal processing apparatus.

Thus there is a need in the art for a digital image signal processing apparatus and method. The method including determining a saturation condition by comparing a delta between a plurality of pieces of image data of an input image exhibiting different color components with a standard for white scene recognition; determining a brightness condition by using a distribution of grey levels of the input image; and determining that the input image is a white scene when the input image satisfies the saturation condition and the brightness condition. The method may include setting settings of the digital image signal processor to capture the white scene, and capturing the white scene.

The attached drawings for illustrating examples of the invention are referred to in order to gain a sufficient understanding of the invention. Hereinafter, the invention will be described in detail by explaining examples of the invention with reference to the attached drawings. Like reference numerals in the drawings denote like elements.

In the following description, an example of a digital image signal processing apparatus is described as a digital camera. Other examples of a digital image signal processing apparatus include but are not limited to a camera phone, a personal digital assistant (PDA), or a portable multimedia player (PMPs) having a camera function.

FIG. 1 is a block diagram of an example of a digital camera embodying an example of a digital image signal processing apparatus.

Referring to FIG. 1, the digital camera includes an optical unit 11 inputting an optical signal from an object (not shown), a driving unit 12 driving the optical unit 11, a photographing device 13 converting the optical signal input through the optical unit 11 into an electric signal, a timing generator 14 supplying a vertical synchronizing signal to the photographing device 13, and an analog signal processor 15 receiving an electric signal corresponding to one frame from the photographing device 13 in synchronization with the vertical synchronizing signal, and performing noise reduction processing on the electric signal and signal processing the electric signal, such as converting the electric signal to a digital signal. The digital camera also includes a digital signal processor 20 performing image signal processing on image data provided from the analog signal processor 15. The image data may be input to the digital signal processor 20 in real time. Alternatively, the image data may be temporally stored in a buffer memory 30, and then may be provided to the digital signal processor 20. The digital camera also includes a recording unit 40 configured to record an image data and selected information, and a displaying unit 50 configured to display an image. Also, the digital camera may include a program storage unit 60 storing a program related to an operation of the digital camera, an operating unit 70 inputting a user's operation signal, a communicating unit 80 receiving and transmitting information from and to an external server or a terminal, and a flash 90 capable of providing light. In addition, the digital camera includes a controller 100 controlling each of the components described above according to a user's operation signal or an input image.

In FIG. 1, components are separately illustrated in respective blocks. Alternatively, two or more components may be configured to be a single chip. Additionally, a component performing two or more functions may be configured in two or more chips.

In detail, the optical unit 11 may include a lens (not shown) focusing an optical signal, an aperture (not shown) configured to adjust the amount of the optical signal, and a shutter (not shown) configured to control input of the optical signal. The lens includes a zoom lens configured to control increase or decrease of a view angle according to a focal length and a focus lens configured to focus the optical signal from the object. The zoom and focus lenses may be provided as individual lenses or in groups of a plurality of lenses. The shutter may be a mechanical shutter moving up and down. However, instead of employing the shutter, the function of the shutter may be performed by controlling the supply of an electric signal to the photographing device 13.

The driving unit 12 may be configured to drive the optical unit 11, which may drive movement of the lens, opening/shutting of the aperture, and operation of the shutter to perform auto-focusing, auto-exposure control, aperture control, zooming, and manual focusing. The driving unit 12 may control the operation of the optical unit 11 according to a control signal output from the controller 100.

The photographing device 13 receives an optical signal output from the optical unit 11 and forms an image of the object. A complementary metal oxide semiconductor (CMOS) sensor array or a charge coupled device (CCD) sensor array may be used as the photographing device 13. The photographing device 13 may provide image data corresponding to an image of a single frame according to a timing signal provided from the timing generator 14.

The analog signal processor 15 may include an analog/digital (A/D) converter (not shown) configured to digitize an electric signal, that is, an analog signal, supplied from the photographing device 13 to form image data. Also, the analog signal processor 15 may include a circuit configured to perform signal processing to adjust gain or regulate a waveform of the electric signal provided from the photographing device 13.

The digital signal processor 20 may reduce noise with respect to the input image data and perform image signal processing such as gamma correction, color filter array interpolation, color matrix, color correction, or color enhancement. Also, the digital signal processor 20 may generate an image file by compressing the image data generated by performing of the image signal processing, or may generate image data from the image file. The image compression format may be reversible or irreversible. For example, the conversion to a Joint Photographic Experts Group (JPEG) format or a JPEG 2000 format may be available. The image file compressed may be stored in the recording unit 40. Also, the digital signal processor 20 may functionally perform sharpness processing, color processing, blur processing, edge emphasis processing, image analysis processing, image recognition processing or image effect processing. Face or scene recognition processing may be performed with the image recognition processing. In addition, the digital signal processor 20 may perform display image signal processing to display an image on the displaying unit 50. For example, the digital signal processor 20 may perform image synthesis processing such as brightness level control, color correction, contrast control, edge emphasis control, screen division processing, or character image. The digital signal processor 20 may be connected to an external monitor and perform predetermined image signal processing to display an image on the external monitor.

The image data provided from the analog signal processor 15 may be transmitted to the digital signal processor 20 in real time. However, when a transmitting speed differs from a processing speed of the digital signal processor 20, the image data may be temporarily stored in the buffer memory 30, and then may be provided to the digital signal processor 20. A memory device such as a synchronous dynamic random access memory (SDRAM), (multi-chip package) (MCP) or a dynamic random access memory may be used as the buffer memory 30.

The image data signal processed by the digital signal processor 20 may be stored in the recording unit 40. Alternatively, the image data may be transmitted to the displaying unit 50 to be displayed as an image. (Secure Digital card) SDcard/(MultiMediaCard) MMC, a hard disk drive (HDD), an optical disk, an optical magnetic disk or a hologram memory may be used as the recording unit 40. A displaying apparatus such as a liquid crystal displaying device (LCD), an organic light emitting device (OLED), a plasma display panel (PDP) or electrophonic display (EDD) may be used as the displaying unit 50.

The program storage unit 60 may store an operating system (OS) needed for operating the digital camera, and application programs.

The operating unit 70 may include a member for a user to manipulate the digital camera or to manipulate control settings for photography. For example, the member may be embodied in buttons, keys, a touch panel, a touch screen, or a dial so that a user control signal for power on/off, photography start/stop, reproduction start/stop/search, driving an optical system, changing modes, manipulating a menu, or selection may be input.

The communicating unit 80 may receive and transmit information from and to an external server or a terminal by using a communication method such as a radio-frequency identification (RFID) technology or wireless Internet platform far interoperability (WIFI).

The flash 90 may check exposure information of the input image, and then may operate, if necessary. Alternatively, the flash 90 may be manually operated by user's manipulation. The flash 90 is needed to compensate for insufficient exposure to light or to obtain special effects.

The controller 100 may control each component of the digital camera according to the application programs stored in the program storage unit 60. In addition the controller may control each component according to a user's operation signal input through the operating unit 70, the input image, and an image processing result of the digital signal processor 20.

Figure 2:
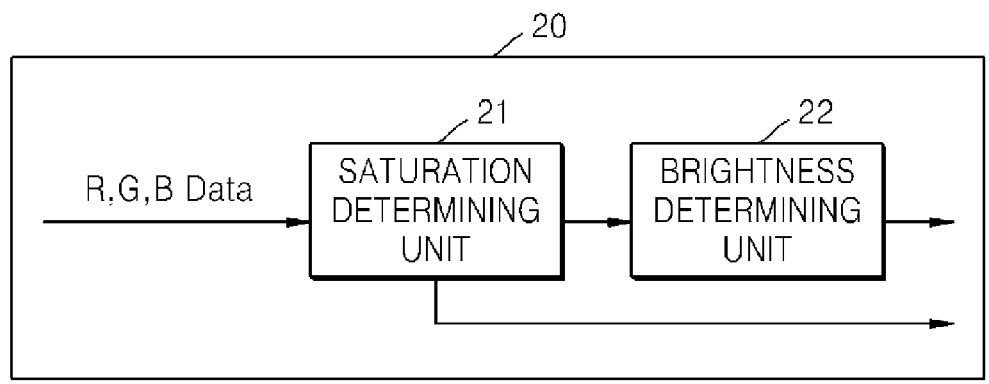
FIG. 2 is a block diagram of the digital signal processor of the digital camera of FIG. 1.

FIG. 2 is a block diagram of the digital signal processor 20 of FIG. 1. Referring to FIG. 2, the digital signal processor 20 includes a saturation determining unit 21 and a brightness determining unit 22.

The saturation determining unit 21 determines whether the input image is a grey image. The saturation determining unit 21 determines a saturation condition by comparing (a difference value) delta between a plurality of pieces of data, that is, (red green blue) RGB data corresponding to different color components with respect to the input image, to a selected standard for white scene recognition. When the delta is greater than the standard, the input image is not a grey image, and therefore the input image is not a white scene. When the delta is less than the standard, the input image satisfies the saturation condition and is determined to be a grey image, and a control signal is transmitted to the brightness determining unit 22.

In addition, the brightness determining unit 22 determines that the input image determined to be a grey image is a white scene when a distribution of (grey levels of) the input image determined to be a grey image has a selected amount or more of grey levels.

According to the example, the digital signal processor 20 determines the saturation condition with respect to the input image, and then determines the brightness of the input image satisfying the saturation condition. In other examples, the digital signal processor 20 may determine a brightness condition of the input image, and then may determine whether the input image satisfying the saturation condition is a white scene.

Figure 3:
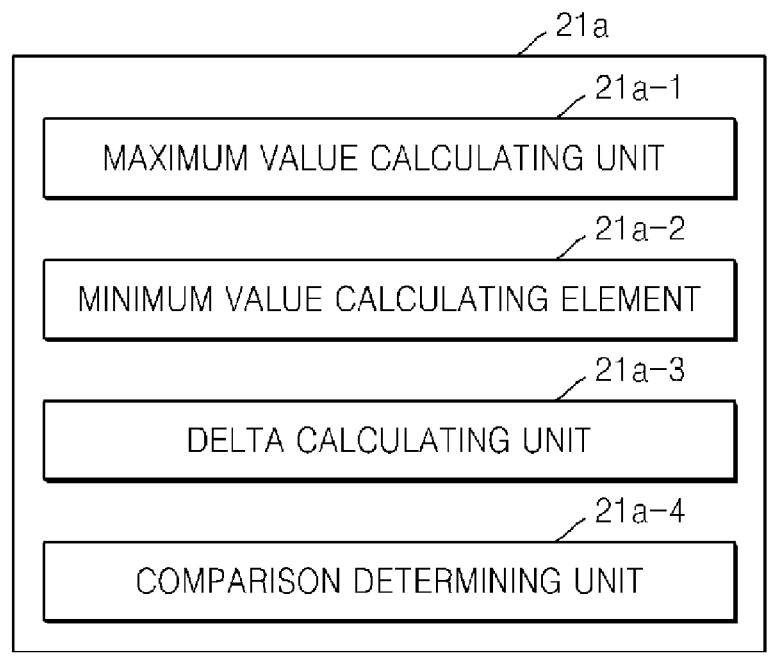
FIG. 3 is a block diagram of an example of a saturation determining unit that may be used in the digital signal processor of FIG. 2.

FIG. 3 is a block diagram of an example of a saturation determining unit 21a that may be used in the digital signal processor 20 of FIG. 2.

Referring to FIG. 3, the saturation determining unit 21a includes a maximum value calculating unit 21a-1 configured to calculate a maximum value of image data from among a plurality of pieces of image data exhibiting different color components on a selected region of the input image, a minimum value calculating unit 21a-2 configured to calculate a minimum value of image data from among the plurality of pieces of image data, a delta calculating unit 21a-3 configured to calculate a delta between the maximum and minimum values, and a comparison determining unit 21a-4 configured to compare the delta with a first standard, wherein the comparison determining unit 21a-4 determines that the selected region satisfies a saturation condition of a white mode when the delta is less than a first standard, and determines that the selected region does not satisfy the saturation condition of the white mode when the delta is greater than the first standard.

In addition, the comparison determining unit 21a-4 may count the number of selected regions satisfying the saturation condition of the white mode and determined to be the grey region, and may compare the number to a third standard. Then, the comparison determining unit 21a-4 may determine that the input image including the selected regions satisfies a saturation condition of a white mode when the number of the selected regions is greater than the third standard, and may determine that the input image does not satisfy the saturation condition when the number of the selected regions is less than the third standard. Thus, the comparison determining unit 21a-4 may determine whether the input image is a grey image.

Figure 4:
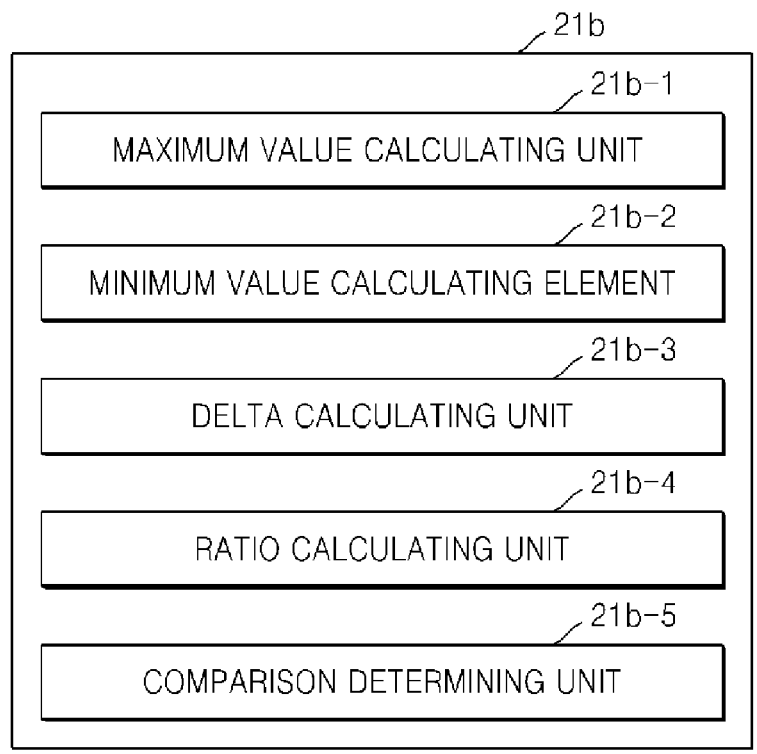
FIG. 4 is a block diagram of an example of a saturation determining unit that may be used in the digital signal processor of FIG. 2.

FIG. 4 is a block diagram of an example of a saturation determining unit 21b that may be used in the digital signal processor 20 of FIG. 2.

Referring to FIG. 4, the saturation determining unit 21b includes a maximum value calculating unit 21b-1 configured to calculate a maximum value of image data from among a plurality of pieces of image data exhibiting different color components on a selected region of an input image, a minimum value calculating unit 21b-2 configured to calculate a minimum value of image data from among the plurality of pieces of image data, a delta calculating unit 21b-3 configured to calculate a delta between the maximum and minimum values, a ratio calculating unit 21b-4 configured to calculate a ratio of the delta to the maximum value, and a comparison determining unit 21b-5 configured to compare the ratio and a second standard, wherein the comparison determining unit 21b-5 determines that the selected region satisfies a saturation condition of a white mode when the ratio is less than the second standard, and determines that the selected region does not satisfy the saturation condition of the white mode when the ratio is greater than the second standard.

In addition, the ratio calculating unit 21b-4 may further determine whether the maximum value is 0 prior to calculating the ratio. In addition, when the maximum value is 0, the ratio calculating unit 21b-4 may transmit a control signal corresponding to this case to the comparison determining unit 21b-5. Then, the comparison determining unit 21b-5 may determine that the selected region satisfies the saturation condition of the white mode, according to the control signal.

The comparison determining unit 21b-5 may count the number of selected regions satisfying the saturation condition of the white mode, and may compare the number to a third standard. Then, the comparison determining unit 21b-5 may determine that the input image including the selected regions satisfies a saturation condition of a white mode when the number of the selected regions is greater than the third standard, and may determine that the input image does not satisfy the saturation condition when the number of the selected regions is less than the third standard. Thus, the comparison determining unit 21b-5 may determine whether the input image is a grey image.

In FIGS. 3 and 4, it may be determined whether each of pixels of the input image satisfies a saturation condition by using RGB image data of each pixel. The saturation condition may also be determined using the RGB data for each of respective block including at least two pixels. In addition, when a pixel satisfies the saturation condition, it may be determined whether the input image is a grey image.

Figure 5:
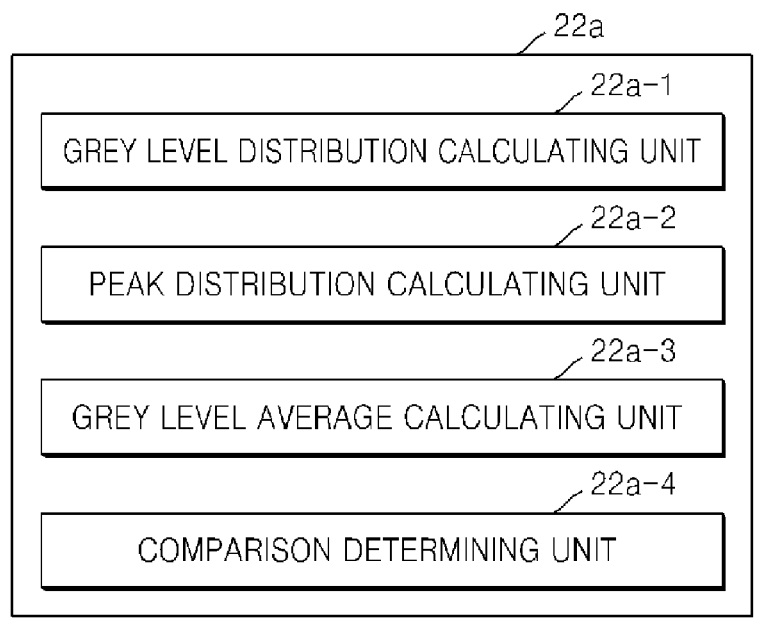
FIG. 5 is a block diagram of an example of a brightness determining unit that may be used in the digital signal processor of FIG. 2.

FIG. 5 is a block diagram of an example of a brightness determining unit 22a that may be used in the digital signal processor 20 of FIG. 2.

Referring to FIG. 5, the brightness determining unit 22a includes a grey level distribution calculating unit 22a-1 determining a distribution of grey levels of the input image, a peak distribution calculating unit 22a-2 configured to calculate (determining) a peak distribution region in the distribution, a grey level average calculating unit 22a-3 configured to calculate a grey level average with respect to at least one region included in the peak distribution region, and a comparison determining unit 22a-4 determining the grey level average with a fourth standard, wherein the comparison determining unit 22a-4 determines that the input image is not a white scene when the grey level average is less than the fourth standard, and determines that the input image is a white scene when the grey level average is greater than the fourth standard.

Figure 6:
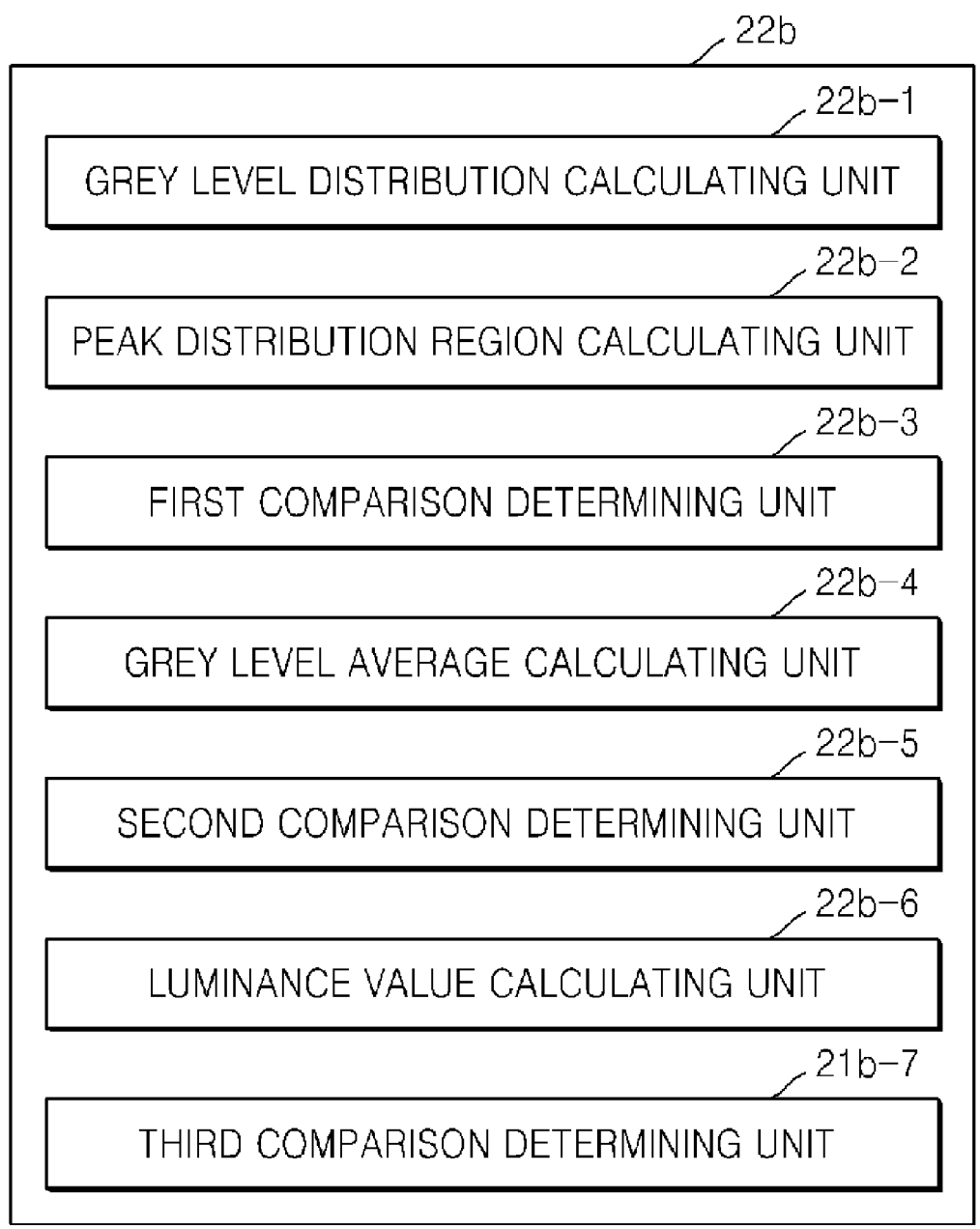
FIG. 6 is a block diagram of an example of a brightness determining unit that may be used in the digital signal processor of FIG. 2.

FIG. 6 is a block diagram of an example of a brightness determining unit 22b that may be used in the digital signal processor 20 of FIG. 2.

Referring to FIG. 6, the brightness determining unit 22b includes a grey level distribution calculating unit 22b-1 configured to determine a distribution of grey levels of the input image, a peak distribution region calculating unit 22b-2 configured to determine a peak distribution region in the distribution, a first comparison determining unit 22b-3 configured to calculate an area of the peak distribution region and compare the area with a fifth standard, wherein the first comparison determining unit 22b-3 determines that the input image is not a white scene when the area is less than the fifth standard, a grey level average calculating unit 22b-4 calculating a grey level average with respect at least one selected region included in the peak distribution region when the area is greater than the fifth standard, and a second comparison determining unit 22b-5 comparing the grey level average with a fourth standard, wherein the second comparison determining unit 22b-5 determines that the input image is not a white scene when the grey level average is less than the fourth standard, and determines that the input image is a white scene when the grey level average is greater than the fourth standard.

The first comparison determining unit 22b-3 may calculate a ratio of the area of the peak distribution region to the entire area of the distribution, and then compare the ratio to a sixth standard, and thus may determine that the input image is a white scene when the ratio is less than the sixth standard. In addition, the grey level average calculating unit 22b-4 may calculate the grey level average by using the above-described method when the ratio is greater than the sixth standard.

The brightness determining unit 22b may include a luminance value calculating unit 22b-6 calculating luminance value of the input image, and a third comparison determining unit 22b-7 comparing the luminance value with a seventh standard, wherein the third comparison determining unit 22b-7 determines the input image is not a white scene when the luminance value is greater than the seventh standard, and determines that the input image is a white scene when the luminance value is less than the seventh standard. The luminance value calculating unit 22b-6 may calculate a luminance value 'Y' of each pixel by using RGB data of each pixel, according to Equation 1 below. Further, the luminance value calculating unit 22b-6 may calculate a delta luminance value LV by using a difference between the luminance value 'Y' and a target luminance value 'Target Y', according to Equation 2 below, and may determine exposure degree consistent with a white scene as photography information by adding the delta luminance value LV to a previous luminance value LV and then calculating a current luminance value LV as in Equation 3. In addition, the luminance value calculating unit 22b-6 may determine a distribution of the number of pixels according to luminance value, and may calculate an average of the peak distribution region. The third comparison determining unit 22b-7 compares the average to a selected standard. Then, the third comparison determining unit 22b-7 may determine the input image is not a white scene when the average is greater than the selected standard, and may determine the input image is a white scene when the average is less than the selected standard.

$$Y = 0.27R + 0.687G + 0.06B \quad (1)$$

$$\text{Delta } LV = \log_2 Y - \log_2(\text{Target } Y) \quad (2)$$

$$\text{Current } LV = \text{previous } LV + \text{delta } LV \quad (3)$$

The brightness determining unit 22b includes the grey level distribution calculating unit 22b-1, the peak distribution region calculating unit 22b-2, the first comparison determining unit 22b-3, the grey level average calculating unit 22b-4, the second comparison determining unit 22b-5, the luminance value calculating unit 22b-6, and the third comparison determining unit 22b-7. In other examples, the brightness determining unit 22b may only include the grey level distribution calculating unit 22b-1, the peak distribution region calculating unit 22b-2, the first comparison determining unit 22b-3, the grey level average calculating unit 22b-4, and the second comparison determining unit 22b-5, or may include the grey level distribution calculating unit 22b-1, the peak distribution region calculating unit 22b-2, the first comparison determining unit 22b-3, the luminance value calculating unit 22b-6, and the third comparison determining unit 22b-7.

In addition, the peak distribution region calculating units 22a-2 and 22b-2 of FIGS. 5 and 6 may calculate a peak point in the distribution, and then may determine a region describing a parabola with respect to the peak point as the peak distribution region, or alternatively may determine a region whose surroundings have a small distribution deviation with respect to the peak point as the peak distribution region. The region describing a parabola, and the range of the distribution deviation may be previously determined according to a user, or a manufacturer.

In addition, standards needed to determine a white scene by using the above-described method may use values that are previously determined by a user, or a manufacturer.

Figure 7:
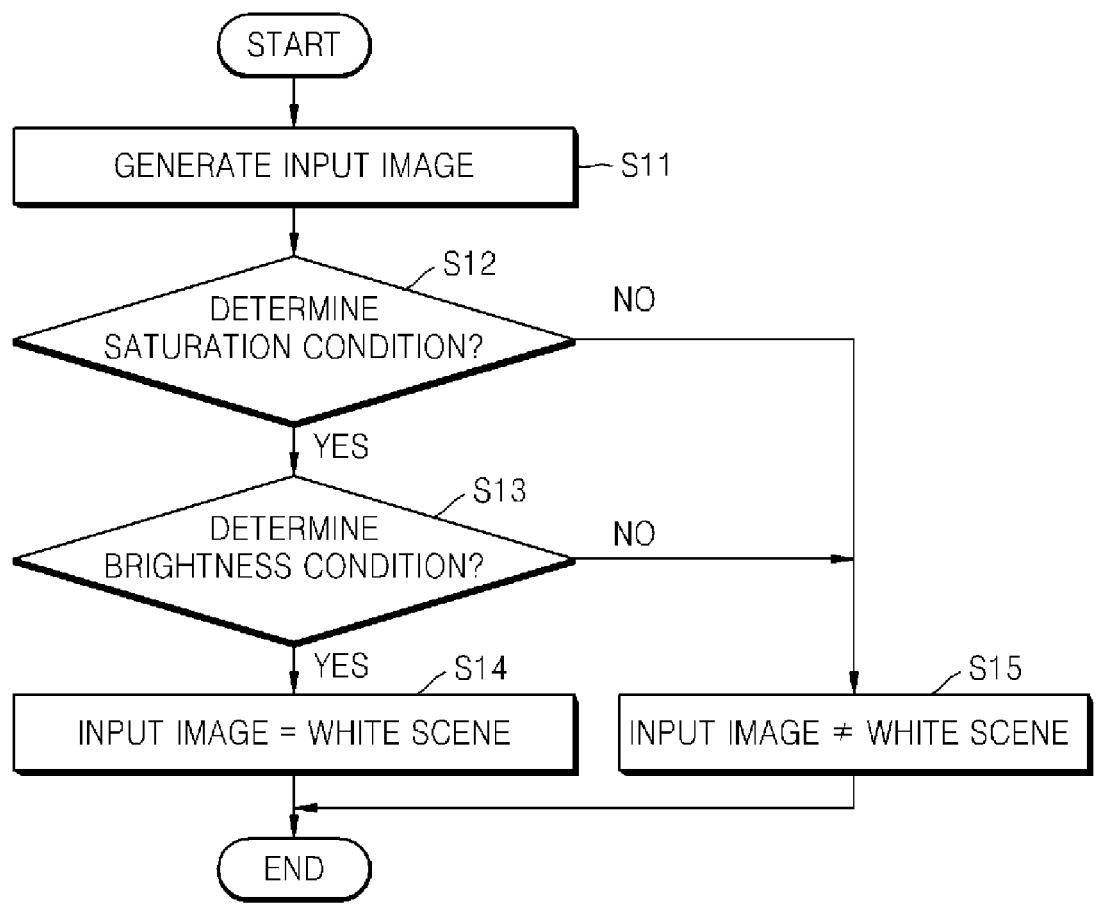
FIG. 7 is a flowchart of an example of a digital image signal processing method.

FIG. 7 is a flowchart of an example of a digital image signal processing method.

Referring to FIG. 7, an input image is generated (operation S11). A saturation condition of the input image is determined (operation S12). A difference value delta among a plurality of pieces of image data of pixels or a difference value delta among blocks of the input image may be calculated. Then when the delta is less than a selected standard, a corresponding pixel or block is determined to be a grey region. When an area of the grey regions is greater than an area of remaining regions of the input image, the input image may be determined as a grey image. That is, the input image may be determined to satisfy a saturation condition.

When the input image satisfies the saturation condition, a brightness condition of the input image is determined (operation S13). A distribution of a grey level of the input image is calculated. When the distribution of a grey level or an average of a peak distribution region is greater than a selected standard, the input image is determined to satisfy the saturation condition. When the input image is divided into a plurality of blocks, it may be determined whether each block is a white scene. When the ratio of white regions with respect to the entire area of the input image is greater than a selected standard, the input image is determined to satisfy the luminance value condition.

When the input image satisfies the luminance value condition, it may be determined whether the input image is a white scene by using the above-described method (operation S14).

When the input image does not satisfy the saturation condition and the brightness condition, it may be determined that the input image is not a white scene (operation S15).

Hereinafter, a method of determining a saturation condition will be described in more detail.

Figure 8:
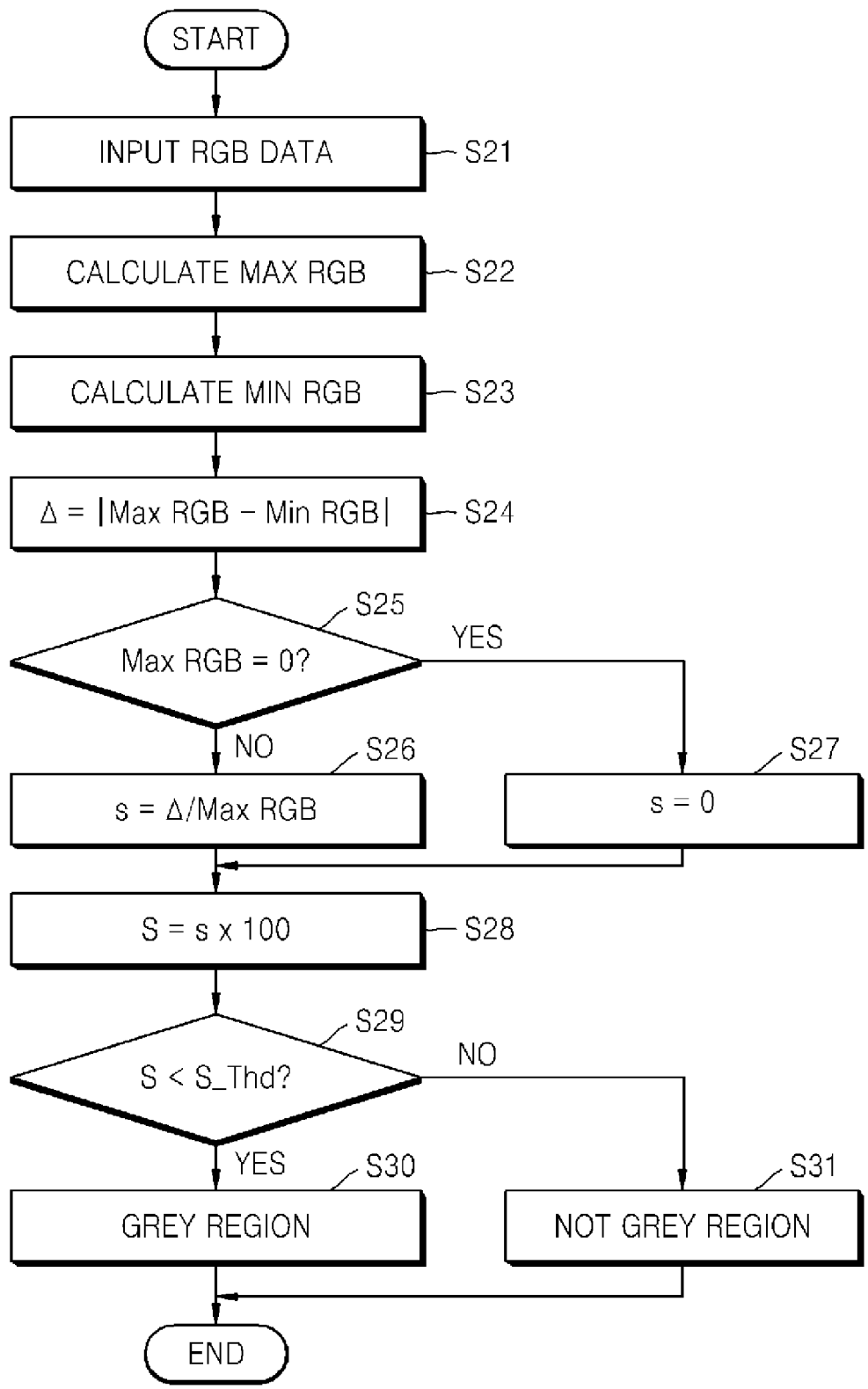
FIG. 8 is a flowchart of an example of a method of determining a saturation condition used in the digital image signal processing method of FIG. 7.

FIG. 8 is a flowchart of an example of a method of determining a saturation condition used in the digital image signal processing method of FIG. 7.

Referring to FIG. 8, an input image is input. The input image includes raw data for a plurality of pixels. RGB data that is raw data of a pixel is input (operation S21). A maximum value MAX RGB is determined from among the RGB data (operation S22). A minimum value MIN RGB is calculated from among the RGB data (operation S23). The order of calculating the maximum and minimum values MAX RGB and MIN RGB may be reversed.

A delta 'Δ' between the maximum and minimum values MAX RGB and MIN RGB is calculated (operation S24). When the delta 'Δ' is less than a selected standard, the pixel is determined to be a grey region. When the delta 'Δ' is greater than the selected standard, it may be determined that the pixel is not a grey region. However, in other examples, it may be determined whether the pixel is a grey region by calculating the delta 'Δ' and comparing a selected ratio involving the delta 'Δ'.

It is determined whether the maximum value MAX RGB is 0 (operation S25). When the maximum value MAX RGB is not 0, a ratio 's' of the delta 'Δ' to the maximum value MAX RGB is calculated (operation S26) (above it was the minimum). When the maximum value MAX RGB is 0, the ratio 's' is determined to be 0 (operation S27).

A percentage 'S' of the ratio 's' is calculated (operation S28). It is determined whether the percentage 'S' is less than a selected standard S_Thd (operation S29). When the percentage 'S' is less than the selected standard S_Thd, the pixel is determined to be a grey region (operation S30). When the percentage 'S' is greater than the selected standard S_Thd, it is determined that the pixel is not a grey region (operation S31).

According to the example, saturation is determined by using RGB data for each pixel. In other examples, saturation may be determined for each block.

It is determined whether each pixel is a grey region by using the above-described method.

Figure 9:
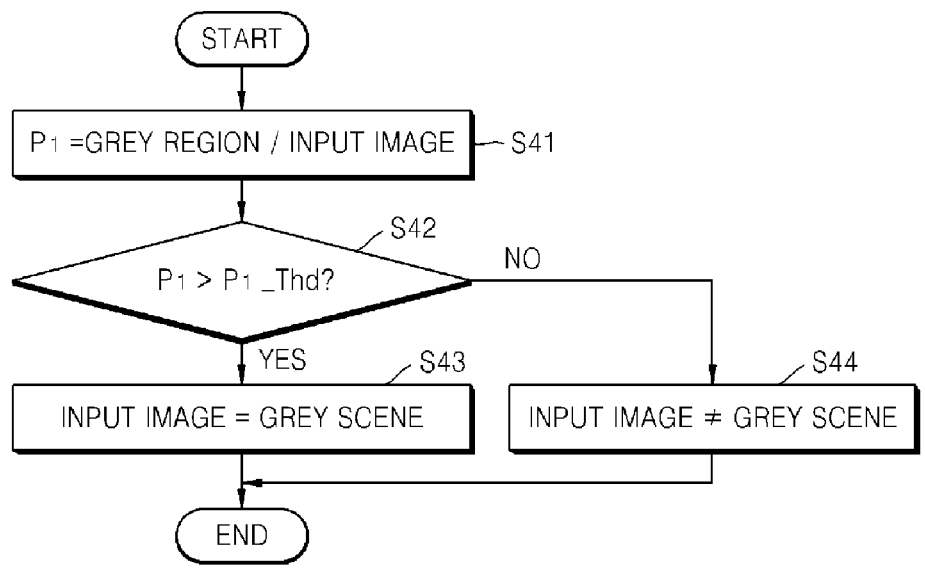
FIG. 9 is a flowchart of an example of a method of determining a saturation condition used in the digital image signal processing method of FIG. 7.

Referring to FIG. 9, a ratio P1 of grey regions with respect to the entire region of the input image is calculated (operation S41). It is determined whether the ratio P1 is greater than a standard P1_Thd (operation S42).

When the ratio P1 is greater than the standard P1_Thd, the input image is determined to be a grey image (operation S43). When the ratio P1 is less than the standard P1_Thd, it is determined that the input image is not a grey image (operation S44).

Hereinafter, a method of determining a brightness condition will be described in more detail.

Figure 10:
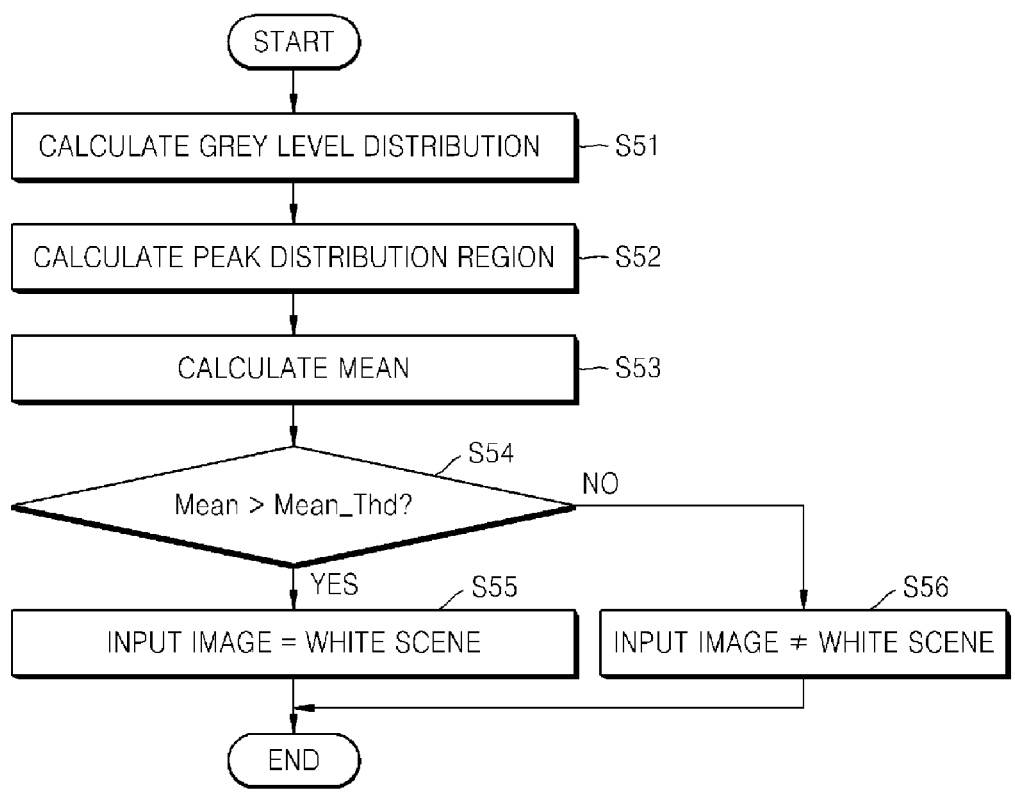
FIG. 10 is a flowchart of an example method of determining a brightness condition used in the digital image signal processing method of FIG. 7.

FIG. 10 is a flowchart of a method of determining a brightness condition used in the digital image signal processing method of FIG. 7.

Figure 11:
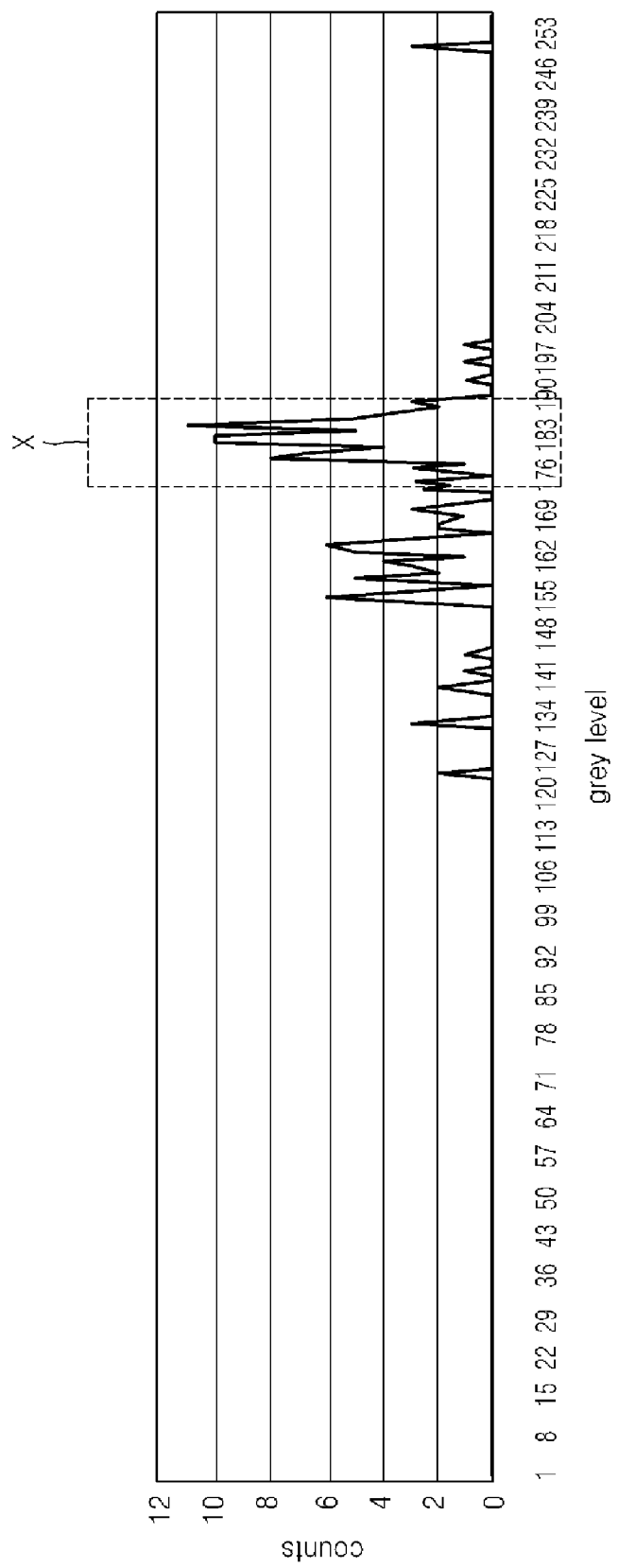
FIG. 11 is a histogram of an example of grey level distribution of an input image.

Referring to FIG. 10, a distribution of grey levels of the input image is determined (operation S51). The calculated distribution may be indicated by a histogram. For example, a distribution count according to an 8 bit-based grey level may be indicated by a histogram, as shown in FIG. 11.

A peak distribution region is calculated (operation S52). The peak distribution region is a region where the peak pieces of data are distributed, which will be described with reference to FIG. 12.

A mean of the pieces of data distributed on the peak distribution region is calculated (operation S53).

It is determined whether the mean is greater a selected standard Mean-Thd (operation S54). When the mean is greater than the standard Mean-Thd, the input image is determined to be a white scene (operation S55). When the mean is less than the standard Mean-Thd, it is determined that the input image is not a white scene (operation S56).

Figure 12:
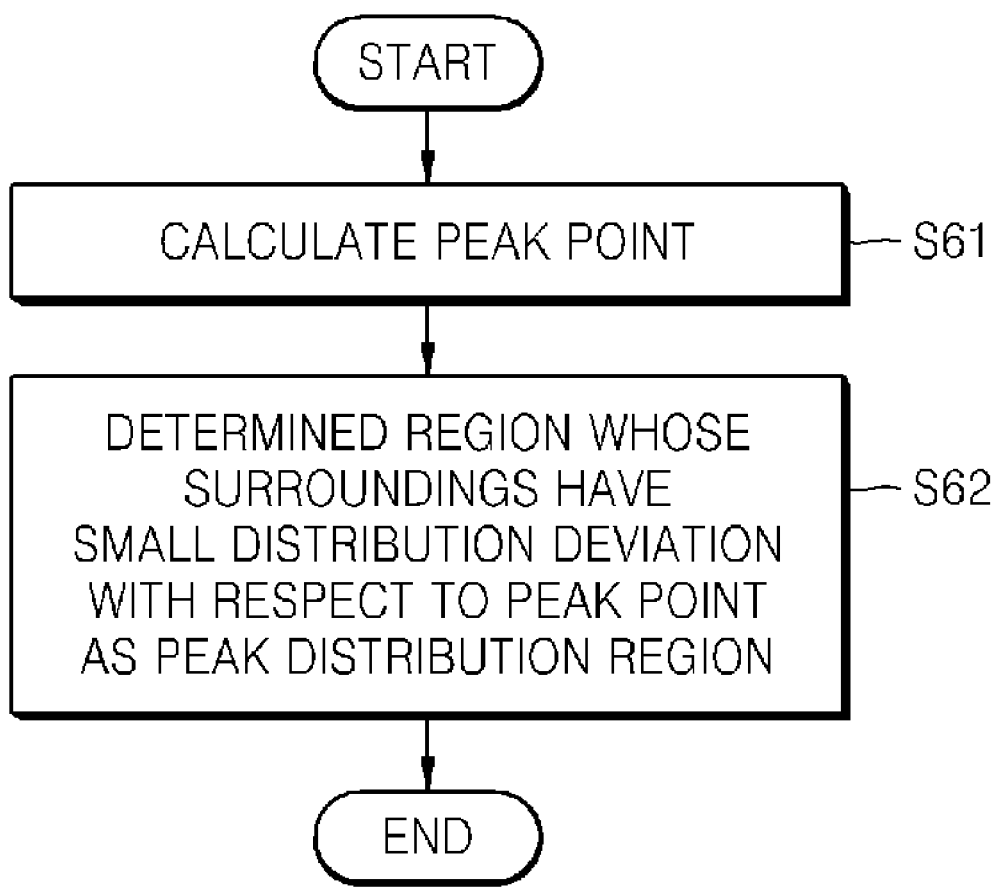
FIG. 12 is a flowchart of an example of a method of calculating a peak distribution region used in the method of determining a brightness condition of FIG. 10.

FIG. 12 is a flowchart of an example of a method of calculating the peak distribution region used in the method of determining a brightness condition of FIG. 10.

Referring to FIG. 12, a peak point is determined in the distribution (operation S61). A region whose surroundings have a small distribution deviation with respect to the peak point may be determined as the peak distribution region (operation S62). The peak distribution region corresponds to a region X of FIG. 11.

According to another example, a region describing a parabola with respect to the peak point may be determined as the peak distribution region.

The distribution deviation, and the range of the region may be previously determined according to a user, a manufacturer, or a previous experimental value.

Figure 13:
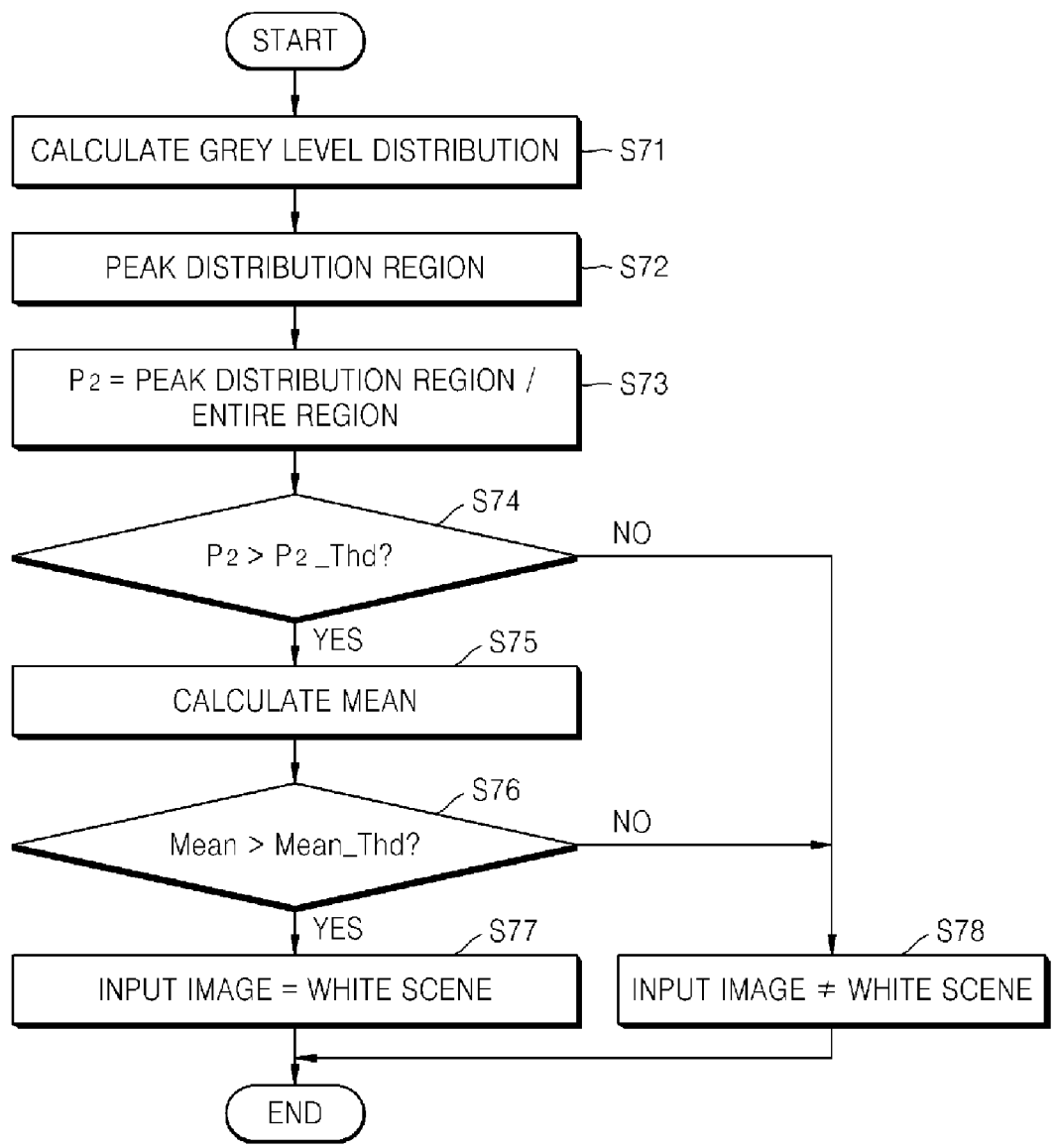
FIG. 13 is a flowchart of an example of a method of determining a brightness condition used in the digital image signal processing method of FIG. 7.

FIG. 13 is a flowchart of an example of a method of determining a brightness condition used in the digital image signal processing method of FIG. 7.

Referring to FIG. 13, a grey level distribution such as the histogram of FIG. 11 is determined (operation S71). A peak distribution region is determined, as described in the previous examples (operation S72). A ratio P2 of the peak distribution region with respect to the entire area of the grey level distribution is calculated (operation S73). It is determined whether the ratio P2 is greater than a selected standard P2_Thd (operation S74). When the ratio P2 is greater than the standard P2_Thd, a mean of the peak distribution region is calculated (operation S75). It is determined whether the mean is greater than a selected standard Mean_Thd (operation S76). When the mean is greater than the standard Mean_Thd, the input image is determined to be a white scene (operation S77). When the mean is less than the standard (Mean_Thd), it may be determined that the input image is not a white scene (operation S78).

When the ratio P2 is less than a selected standard P2_Thd, it may be determined that the input image is not a white scene (operation S78). In this specification, a white scene refers to a scene where many white colors are distributed, such as a snow scene. If many regions of the input image exhibit the same white color, the many regions need to exhibit the same grey level. Thus, in order to determine a velocity of scene recognition, it is determined whether an area of the peak distribution region is greater than a selected standard for white scene recognition, prior to calculating the mean of the peak distribution region.

Figure 14:
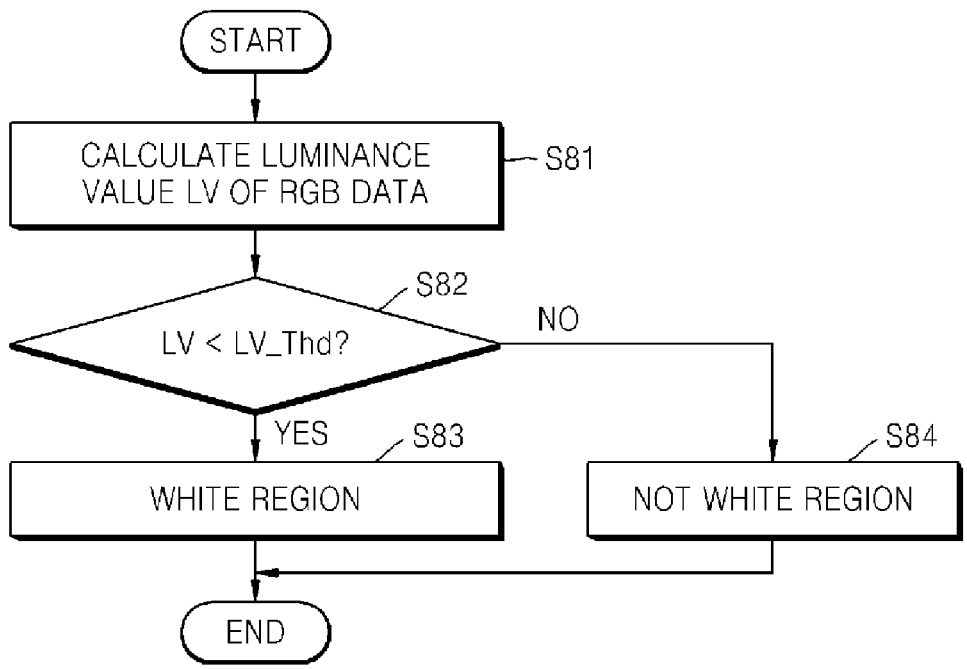
FIGS. 14 and 15 are flowcharts of an example method of determining a brightness condition used in the digital image signal processing method of FIG. 7.
Figure 15:
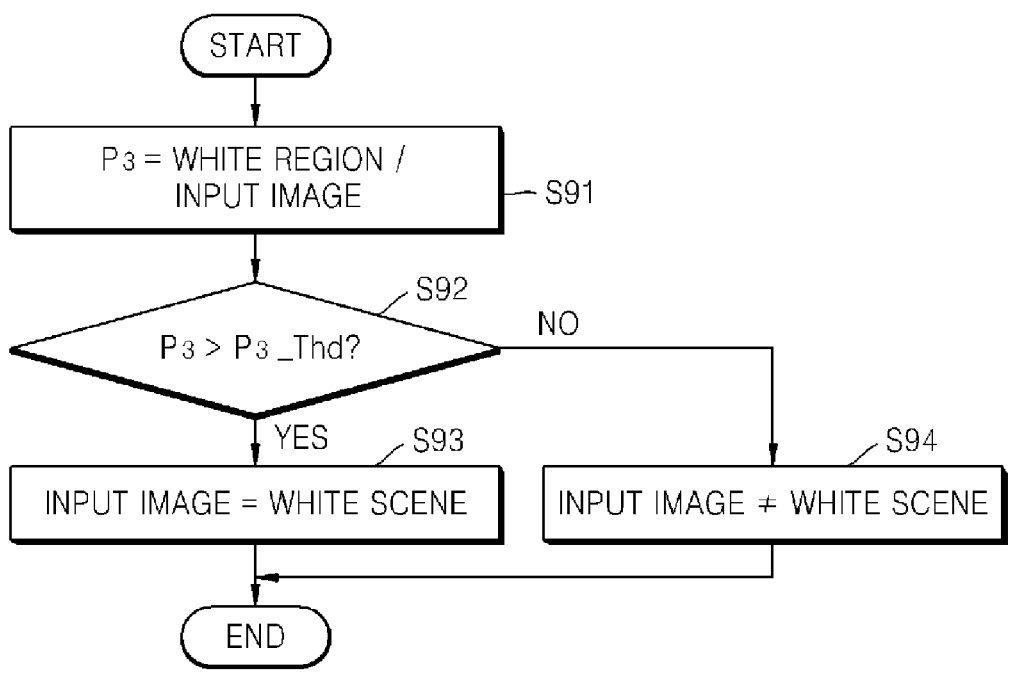

FIGS. 14 and 15 are flowcharts of an example of a method of determining a brightness condition used in the digital image signal processing method of FIG. 7.

Referring to FIG. 14, a luminance value LV of RGB data of each pixel region of an input image is calculated (operation S81). It is determined whether the luminance value LV is less than a selected standard LV_Thd (operation S82). When the luminance value LV is less than the standard LV_Thd, the pixel region is determined to be a white region (operation S83). When luminance value LV is greater than the standard LV_Thd, it is determined that the pixel region of the pixel is not a white region (operation S84). When the input image as well as a pixel region is divided for each respective block, a white region may be determined using the above method.

Referring to FIG. 15, a ratio P3 of white regions with respect to the entire area of the input image is calculated (operation S91).

It is determined whether the ratio P3 is greater than a selected standard P3_Thd (operation S92). When the ratio P3 is greater than the standard P3_Thd, the input image is determined to be a white scene (operation S93). When the ratio P3 is less than the standard P3_Thd, it is determined that the input image is not a white scene (operation S94).

For example, although the input image may be a grey image instead of a white image, the input image may be recognized as a white scene due to a high exposure value of the input image. Thus, when the input image is determined to be a white scene according to the previous examples, a luminance value of image data is compared to a selected standard. Then, when the luminance value is greater than the standard, the input image is finally determined to be a white scene. On the other hand, when the luminance value is less than the standard, it may be determined that the input image is recognized due to having a high exposure value. That is, it may be determined that the input image is not a white scene.

The method of determining a brightness condition according to the example may be further included in the methods of determining a brightness condition of FIG. 10 or 12. Thus, a white scene may be accurately recognized.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

According to the invention, saturation of an input image is determined using a difference value delta of a plurality of pieces of image data exhibiting different color components, and brightness of the input image is determined using a distribution (of grey levels), and thus a white scene may be effectively determined. Thus, a photography condition appropriate to a white scene may be determined, and thus a desired photography image may be obtained.

In addition, a white scene may be correctly determined by further performing determination using a distribution of luminance values.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A digital image signal processing method comprising:
   determining a saturation condition by comparing a delta between a plurality of pieces of image data of an input image exhibiting different color components with a standard for white scene recognition, wherein the determining of the saturation condition comprises:
      determining a maximum value from among a plurality of pieces of image data exhibiting different color components on a selected region;
      determining a minimum value from among the plurality of pieces of the image data of the selected region;
      calculating a delta between the maximum value and the minimum value;
      comparing the delta to a first standard; and
      determining that the selected region satisfies a saturation condition of a white mode when the delta is less than a first standard;
   determining a brightness condition by using a distribution of grey levels of the input image; and
   determining that the input image is a white scene when the input image satisfies the saturation condition and the brightness condition.

2. The digital image signal processing method of claim 1, further comprising:
   comparing a number of a plurality of selected regions satisfying the saturation condition of the white mode with a third standard; and
   determining that the input image comprising the plurality of the selected regions satisfies the saturation condition of the white mode when the number of the plurality of selected regions is greater than the third standard.

3. A digital image signal processing method comprising:
   determining a saturation condition by comparing a delta between a plurality of pieces of image data of an input image exhibiting different color components with a standard for white scene recognition, wherein the determining of the saturation condition comprises:

determining a maximum value from among a plurality of pieces of image data exhibiting different color components on a selected region;

determining a minimum value from among the plurality of pieces of the image data;

calculating a delta between the maximum value and the minimum value;

calculating a ratio of the delta to the maximum value;

comparing the ratio to a second standard; and determining that the selected region satisfies a saturation condition of a white mode when the ratio is less than the second standard;

determining a brightness condition by using a distribution of grey levels of the input image; and determining that the input image is a white scene when the input image satisfies the saturation condition and the brightness condition.

4. The digital image signal processing method of claim 3, further comprising:

determining whether the maximum value is 0; and determining that the selected region satisfies the saturation condition of the white mode when the maximum value is 0.

5. A digital image signal processing method comprising:

determining a saturation condition by comparing a delta between a plurality of pieces of image data of an input image exhibiting different color components with a standard for white scene recognition;

determining a brightness condition by using a distribution of grey levels of the input image, wherein the determining of the brightness condition comprises:

generating a distribution of grey levels of the input image;

determining a peak distribution region in the distribution;

determining a grey level mean with respect to at least one selected region of the peak distribution region;

comparing the mean with a fourth standard; and determining that the input image is not a white scene when the mean is less than the fourth standard; and determining that the input image is a white scene when the input image satisfies the saturation condition and the brightness condition.

6. The digital image signal processing method of claim 5, further comprising: prior to the calculating of the grey level mean, comparing an area of the peak distribution region with a fifth standard; and determining that the input image is not a white scene when the area of the peak distribution region is less than the fifth standard.

7. The digital image signal processing method of claim 5, further comprising: prior to the calculating of the grey level mean, calculating a ratio of the area of the peak distribution region with respect to an entire area of the distribution;

comparing the ratio with a sixth standard; and determining that the input image is not a white scene when the ratio is less than the sixth standard.

8. The digital image signal processing method of claim 5, wherein the calculating of the peak distribution region comprises:

determining a peak point in the distribution; and determining a region whose surroundings have a small distribution deviation with respect to the peak point as the peak distribution region.

9. The digital image signal processing method of claim 5, further comprising:

calculating a luminance value of the input image;

comparing the luminance value with a seventh standard;

determining that the input image is not a white scene when the luminance value is greater than the seventh standard.

10. A non-transitory computer-readable medium encoded with a computer-executable program to perform a method comprising:

determining a saturation condition by comparing a delta between a plurality of pieces of image data of an input image exhibiting different color components with a standard for white scene recognition;

determining a brightness condition by using a distribution of grey levels of the input image, wherein the determining of the brightness condition comprises:

generating a distribution of grey levels of the input image;

determining a peak distribution region in the distribution;

determining a grey level mean with respect to at least one selected region of the peak distribution region;

comparing the mean with a fourth standard; and determining that the input image is not a white scene when the mean is less than the fourth standard; and determining that the input image is a white scene when the input image satisfies the saturation condition and the brightness condition.

11. A digital image signal processing apparatus comprising:

a saturation determining unit configured to determine a saturation condition by comparing a delta between a plurality of pieces of image data exhibiting different color components with respect to an input image with a standard for white scene recognition, wherein the saturation determining unit comprises:

a maximum value calculating unit configured to calculate a maximum value from among a plurality of pieces of image data exhibiting different color components on a selected region;

a minimum value configured to calculate a minimum value from among the plurality of pieces of the image data of the selected region;

a delta calculating unit configured to calculate a delta between the maximum value and the minimum value; and a comparison determining unit configured to compare the delta to a first standard, and configured to determine that the image of the selected region satisfies a saturation condition of a white mode when the delta is less than a first standard; and a bright determining unit configured to determine a brightness condition by using a distribution of grey levels of the input image.

12. The digital image signal processing apparatus of claim 11, wherein the comparison determining unit is configured to compare a number of selected regions satisfying the saturation condition of the white mode to a third standard, and configured to determine that the input image comprising the plurality of the selected regions satisfies the saturation condition of the white mode when the number of the plurality of selected regions is greater than the third standard.

13. A digital image signal processing apparatus comprising:

a saturation determining unit configured to determine a saturation condition by comparing a delta between a plurality of pieces of image data exhibiting different color components with respect to an input image with a standard for white scene recognition, wherein the saturation determining unit comprises:
- a maximum value calculating unit configured to calculate a maximum value from among a plurality of pieces of image data exhibiting different color components on a selected region;
- a minimum value calculating unit configured to calculate a minimum value from among the plurality of pieces of the image data;
- a delta calculating unit configured to calculate a delta between the maximum value and the minimum value; and
- a comparison determining unit configured to compare a ratio of the delta to the maximum value with a second standard, and configured to determine that the selected region satisfies a saturation condition of a white mode when the ratio is less than the second standard; and
- a bright determining unit configured to determine a brightness condition by using a distribution of grey levels of the input image.

14. The digital image signal processing apparatus of claim 13, wherein the comparison determining unit is configured to determine whether the maximum value is 0, and to determine that the selected region satisfies the saturation condition of the white mode when the maximum value is 0.

15. The digital image signal processing apparatus of claim 14, wherein the bright determining unit comprises:
- a grey level distribution calculating unit configured to generate a distribution of grey levels of the input image;
- a peak distribution region calculating unit configured to determine a peak distribution region in the distribution;
- a grey level mean calculating unit configured to calculate a grey level mean with respect to at least one selected region of the peak distribution region; and
- a first comparison determining unit configured to compare the mean with a fourth standard, and determining that the input image is not a white scene when the mean is less than the fourth standard.

16. The digital image signal processing apparatus of claim 15, wherein the peak distribution calculating unit is configured to determine a peak point in the distribution, and to determine a region whose surroundings have a small distribution deviation with respect to the peak point as the peak distribution region.

17. The digital image signal processing apparatus of claim 15, further comprising:
- a luminance value calculating unit configured to calculate a luminance value of the input image; and
- a second comparison determining unit configured to compare the luminance value with a seventh standard, and to determine that the input image is not a white scene when the luminance value is greater than the seventh standard.

18. The digital image signal processing apparatus of claim 14, wherein the bright determining unit comprises a second comparison unit configured to compare an area of the peak distribution region with a fifth standard, and to determine that the input image is not a white scene when the area of the peak distribution region is less than the fifth standard.

19. The digital image signal processing apparatus of claim 18, wherein the second comparison determining unit is configured to compare a ratio of the area of the peak distribution region with respect to an entire area of the distribution with a sixth standard, and to determine that the input image is not a white scene when the ratio is less than the sixth standard.

* * * * *